3,400,161
PURIFICATION OF ALPHA-METHYLIDENE
ALKENALS
Walter August Gleich, John Hart La Rochelle, and Gregor
Hans Riesser, Pasadena, Tex., assignors to Shell Oil
Company, New York, N.Y., a corporation of Delaware
No Drawing. Filed Jan. 27, 1965, Ser. No. 428,571
2 Claims. (Cl. 260—601)

ABSTRACT OF THE DISCLOSURE

Alpha-methylidene alkenals, particularly those of 3 to 4 carbon atoms, such as acrolein and methacrolein, containing minor amounts of corresponding saturated aldehydes as impurities, are purified by reacting with a nontertiary alcohol, particularly a secondary alcohol of 4 to 10 carbon atoms per molecule, as reducing agent, in the presence of a corresponding aluminum alcoholate, at $-30°$ to $70°$ C. for about 5 to about 210 minutes, preferably 10 to 20 minutes. The nontertiary alcohol is used in an amount stoichiometrically greater than the saturated aldehyde but less than the alkenal, and the reaction is terminated after conversion of at least 80% of the saturated aldehyde impurity and between 5 and 55%, preferably 35 to 50%, of the alkenal has been converted to corresponding alcohol, by contacting the mixture with sufficient water to destroy the aluminum alcoholate catalyst. The reaction mixture is then distilled to recover an alkenal.

---

This invention relates to the purification of alpha-methylidene alkenals which contain saturated aldehydes as impurities. It is particularly concerned with a new method for purifying acrolein or methacrolein containing minor amounts of saturated aldehydes.

Certain methods of acrolein production give products contaminated with propionaldehyde while alpha-methylpropionaldehyde is an impurity in methacrolein from certain sources. The closeness of the boiling points of these impurities to those of the alpha-methylidene alkenals in which they are found makes adequate removal of the impurities by conventional distillation unfeasible. The high reactivities of the alpha-methylidene alkenals adds to the difficulty of their purification.

It has now been found that purified fractions of alpha-methylidene alkenals can be obtained by reacting the impure aldehyde with an alcohol under the catalytic influence of aluminum alcoholates and distilling to recover the desired product. This is quite unexpected since as described and claimed in U.S. Patent 2,779,801, alpha-methylidene alkenals are substantially reduced to the corresponding allylic alcohols by treatment with these reactants. It has been discovered, however, that the rate of reduction of the saturated aldehyde impurities is so much higher than the rate of reduction of the alpha-methylidene alkenals of 3 to 4 carbon atoms per molecule that these alkenals can be successfully purified in this way.

In accordane with the invention purified alpha-methylidene alkenals of 3 to 4 carbon atoms are obtained by reaction of the impure starting compound containing saturated aldehyde impurities with alcohol and a catalytic amount of aluminum alkoxide, using conditions controlled so that a regulated partial conversion of the alkenal takes place with a more complete reduction of the impurities. This control of the reaction is readily achieved by adjusting the time of reaction in relationship to the temperature of operation and proportions of the reactants so that a conversion of at least 80% of the aldehyde impurity to corresponding alcohol takes place together with conversion of between about 5% and 55% of the alpha-methylidene alkenal.

The process is carried out in steps. First the impure alpha-methylidene alkenal is admixed with a primary or secondary alcohol, that is an alcohol having at least one hydrogen atom bonded directly to a carbon atom to which an alcohol hydroxyl group is also directly attached. A catalytic amount of aluminum alcoholate is included in the mixture and the reduction which takes place is terminated after conversion of at least 80% of the saturated aldehyde impurity and between 5 and 55% w. or more advantageously about 35% to about 50% w. of the alpha-methylidene alkenal. In the final step of the process the reacted mixture is distilled to separate a purified fraction of alpha-methylidene alkenal from the other components.

Useful byproducts of the process are the saturated aldehyde or ketone formed from the primary or secondary alcohol used for the reduction, and unsaturated primary alcohol derived from the simultaneous reduction of the above-indicated necessary amount of the alpha-methylidene alkenal. There may also be a minor amount of byproduct ester resulting from the aluminum alcoholate-catalyzed condensation of alpha-methylidene alkenal with itself according to the Tischenko reaction. The loss of alpha-methylidene alkenal in this way is relatively small. This ester may be recovered although it is usually not produced in sufficient amount to make this worthwhile.

To achieve the desired reduction of the saturated aldehyde impurities with simultaneous conversion of the required amount of alpha-methylidene alkenal it is necessary, as previously pointed out, to control the time and temperature of reaction and proportions of reactants. Particularly important proportions are those of aluminum alcoholate and nontertiary alcohol to the aldehyde content of the reaction mixture. These are interdependent variables each of which can be varied within limits when properly coordinated with the others so as to effect the indicated necessary reduction of the carbonylic impurities simultaneously with the regulated conversion of alpha-methylidene alkenal.

A variety of nontertiary alcohols can be used for the reduction. The term alcohol is here used in its usual meaning of an organic compound containing a nonacidic hydroxyl group. The alcohols can be monohydric or polyhydric. They preferably are free from nonhydroxy substituents which are reactive under the process conditions with the alpha-methylidene alkenal being purified so that undesirable side reactions will not occur. On this account alcohols which are composed only of carbon, hydrogen and alcoholic hydroxyl are preferred. The mono- and polyhydric alcohols of up to about 18 carbon atoms per molecule are most preferable. While either saturated or unsaturated alcohols can be used, it is preferred that the alcohol used be free from olefinic unsaturation, particularly acetylenic unsaturation. The suitable alcohols can be of either straight-chain or branched-chain configuration, and may contain in their structure either or both of alicyclic or aromatic carbon-to-carbon moieties. Examples of suitable alcohols thus include methanol, ethanol, n-propanol, n-butanol, n-pentanol, n-hexanol, 1-octanol, 2-ethyl-1-hexanol, 1-decanol, ethylene glycol, propylene glycol and like straight-chain primary alcohols, isobutyl alcohol, isoamyl alcohol, secondary butylcarbinol and like branched-chain primary alcohols. Secondary alcohols are especially advantageous because of their reactivity. From the standpoint of convenience, availability, and cost, the lower unsubstituted secondary aliphatic alcohols are especially suitable, although the operable scope of the invention is not limited thereto. For example, cyclic secondary alcohols having the hydroxyl group bonded to a ring carbon atom, or secondary alcohols containing a benzenoid or other type of ring in the molecule, can be used. The alcohol can be substituted to a minor extent by inert substitutents which do not alter the essentially hydrocarbon nature of the secondary radical to which the hydroxyl group is linked. However, it is generally preferred to employ an unsubstituted secondary alcohol, that is, one composed of the hydroxyl group and a hydrocarbon radical to which the hydroxyl is bonded. Secondary alcohols having 3 to 18 carbon atoms per molecule are suitable. Representative secondary alcohols which have been found to be useful as reducing agents include, among others, isopropyl alcohol, secondary butyl alcohol, secondary amyl alcohol, diethyl carbinol, methyl isobutyl carbinol, 5-methyl-3-heptanol, diisobutyl carbinol, dodecanol-2, methyl allyl carbinol, cyclohexanol, methyl cyclohexyl carbinol, phenyl methyl carbinol, and the like. The alcohol chosen for use as the reducing agent should be one which will not itself introduce impurity into the alpha-methylidene alkenal being purified. Thus it should have a boiling point sufficiently different from that of said alkenal so as to be readily separated therefrom by distillation and this should also be true of the aldehyde and/or ketone which is formed from this alcohol in the reduction. On this account it is preferred to use nontertiary alcohols which have a different number of carbon atoms than the alpha-methylidene alkenal being purified. More advantageously the alcohol has at least one more carbon atom per molecule than the alkenal.

The nontertiary alcohol used as reducing agent is employed in an amount at least equivalent to the stoichiometric requirement for the desired degree of reduction of the saturated aldehyde impurities and advantageously in excess of that amount but less than the stoichiometric requirement for reduction of the alpha-methylidene alkenal. The alcohol can be used in proportions of about 0.05 to about 0.8 mole per mole of total aldehyde in the impure alpha-methylidene alkenal which is being purified. Superior results are obtained, however, by using about 0.4 to about 0.6 mole of alcohol per mole of total aldehyde.

There are advantages in using as the aluminum alcoholate catalyst for the reduction alcoholate corresponding to the nontertiary alcohol used as reducing agent. In this way separation of the purified alpha-methylidene alkenal can usually be simplified. It is feasible to use other aluminum alcoholates, however. Suitable aluminum alcoholates comprise those derived from primary, secondary or tertiary aliphatic alcohols and from aromatic alcohols. Examples of such suitable aluminum alcoholates are: aluminum methoxide, aluminum ethoxide, aluminum propoxide, aluminum isopropoxide, aluminum isobutoxide, aluminum allyloxide, aluminum salt of 4-methylpentanol-2, aluminum cyclohexyloxide, etc. The suitable aluminum alcoholates comprise the mixed aluminum alcoholates, that is those wherein the oxygen-containing organic radicals attached to the aluminum atom are dissimilar. Preferred are the aluminum alkoxides wherein each alkoxide group contains from three to eight carbon atoms. Particularly preferred are the aluminum secondary alkoxides having from three to four carbon atoms in each of the alkoxide groups. Of these, aluminum secondary butoxide, is preferred. Mixtures of two or more of the aluminum alkoxides may be used as the catalyst within the scope of the invention. The suitable aluminum alcoholates are prepared in the manner disclosed in the prior art. They may be prepared for example, by reacting aluminum with the appropriate alcohol according to the known methods, and if desired in the presence of a promoter or catalyst for the reaction, such as mercuric chloride. A suitable method for preparing aluminum alcoholates is that disclosed in U.S. Patent 2,845,447, issued July 29, 1958.

In the process of the invention the aluminum alcoholates are employed in no more than catalytic amounts. This is essential if their effect is to be directed to the substantially selective removal of the saturated aliphatic aldehyde contaminants. The catalysts are effective in exceedingly small amounts. In general, they need not be added in an amount exceeding about 3 or 5 M percent of the impure alpha, beta-unsaturated aliphatic aldehyde undergoing treatment. An amount of the aluminum secondary alcoholate in the range of from about 0.4 M percent to about 2.0 M percent, and more preferably in the range of from about 0.8 M percent to about 1.5 M percent, of the impure unsaturated aldehyde being treated will be found satisfactory.

The selective reduction of the saturated aldehyde impurity is advantageously carried out at a temperature in the general range of about −30 to about 70° C. In order to avoid long reaction times it is preferred to operate at a temperature of at least about 35° C. and more preferably between about 35° and about 50° C. The process can be carried out successfully at any pressure at which the reactants are in the liquid phase. Atmospheric or higher pressures are generally suitable but subatmospheric pressures can also be used.

The reaction can be carried out batchwise, intermittently or continuously. The reaction can advantageously be carried out adiabatically or substantially isothermally. Any one of several types of reactor design are suitable, for instance, pipe reactors, tubular heat exchangers, stirred kettles, etc. In any case, since water has a pronounced deleterious effect on the reaction when using only small catalytic amounts of aluminum alcoholate in accordance with the invention, it is highly desirable to employ anhydrous reactants and to protect the reaction system from any contamination with moisture. One suitable method of batch reaction is to heat to the desired reaction temperature a solution of the chosen aluminum alcoholate catalyst in the secondary alcohol being employed as reducing agent and then add the alpha-methylidene alkenal to the catalyst solution with vigorous stirring to insure thorough mixing while maintaining the temperature within the desired range. At the end of the reaction period water can be added to destroy the catalyst and prevent further reaction and the products can be recovered by distillation.

The process can be carried out continuously by feeding a solution of the catalyst in part of the secondary alcohol and a solution of the alpha-methylidene alkenal in the remaining amount of secondary alcohol required to give the desired ratio of alcohol to aldehyde through a mixing nozzle or other suitable device which will insure prompt, uniform mixing, and conducting the mixture through a reactor provided with temperature control means. A jacketed reaction tube which may, for instance, be in the form of a coil or, more advantageously, a vertical pipe having an axial stirrer, is suitable. The flow rate through the reactor is adjusted so as to provide the desired reaction time.

The time of reaction which will be most advantageous will vary with the reaction temperature, amount of catalyst, etc. Analysis of the reaction mixture to determine the degree of conversion of the aldehyde is one suitable method for determining when to terminate the reduction. This should be done when about 80% or more of the saturated aldehyde has been converted but before substantial conversion of the alpha-methylidene alkenal takes place. Under the previously indicated reaction conditions a reaction time of about 5 to about 210 minutes is usually suitable, depending on the other process conditions, with times between about 10 and about 20 minutes being generally more advantageous. The reaction can be conveniently terminated by running the reaction mixture into water.

Besides the desired alpha-methylidene alkenal, the reaction mixture will contain saturated aldehyde or ketone formed from the nonprimary alcohol used for the reduction as well as the various possible byproducts previously mentioned. The alpha-methylidene alkenal can be recovered from this mixture as a purified fraction by distillation to separate the higher and lower boiling components.

The following examples illustrate suitable methods of carrying out the process of the invention and show some of the advantages which can be obtained.

EXAMPLE I

This example illustrates the purification of acrolein having the following composition:

| | Percent w. |
|---|---|
| Acrolein | 94.33 |
| Propionaldehyde | 2.63 |
| Other impurities | 3.04 |

The purification is carried out in water cooled pipe reactor into which the acrolein is fed together with a solution of aluminum secondary butoxide in secondary butyl alcohol. The rates of feed are adjusted so that the mole ratios of aluminum alkoxide and secondary alcohols to aldehyde in the feed are 0.02 and 0.6 respectively.

After reactor residence time of about 11 minutes at a temperature of 49° C. the mixture is run into water to destroy the catalyst. Under these conditions the conversion of saturated aldehyde is 93.4% while 50% of the acrolein is converted to allyl alcohol. Distillation of the product to remove higher and lower boiling materials yields a fraction of purified acrolein of about the following composition:

| | |
|---|---|
| Acrolein | 99.00 |
| Propionaldehyde | 0.69 |
| Other impurities | 0.31 |

Methyl ethyl ketone is recovered as a byproduct from the secondary butyl alcohol consumed in the reduction. Allyl alcohol is the other important byproduct recovered.

EXAMPLE II

When acrolein containing the same impurities is purified as in Example I using a solution of tri(secondary pentyloxy)aluminum in secondary amyl alcohol equally good purification is obtained under the same conditions.

EXAMPLE III

Methacrolein containing a minor amount of alpha-methylpropionaldehyde as impurity is purified under the conditions of Example I using aluminum isopropoxide in isopropyl alcohol as the reducing agent.

It will thus be seen that the invention offers many advantages and is capable of considerable modification. It is not restricted to the modifications which have been given by way of illustration. Nor is the invention to be restricted by any theory given in explanation of the improved results which are obtained.

We claim as our invention:

1. A process for purifying acrolein containing propionaldehyde as impurity in minor amount which comprises
   admixing the impure acrolein with a secondary alkanol having 4 to 6 carobn atoms per molecule in the proportions of between about 0.4 and about 0.6 mole of alkanol per mole of aldehyde in the impure mixture together with about 0.1 to about 5 mole percent of aluminum alcoholate of said secondary alkanol based upon the aldehyde in the mixture,
   maintaining the reaction mixture at about 35° to about 50° C. for a period of about 10 to about 20 minutes, then
   terminating the reaction by contacting the mixture with sufficient water to destroy the aluminum alcoholate when at least 80% of said impurity has been converted to alcohol together with between about 35 and about 55% of the acrolein and
   distilling the reaction mixture to separate a purified fraction of acrolein from the other components of the reacted mixture.

2. A process in accordance with claim 1 wherein the acrolein is purified by treatment with a solution of aluminum secondary butoxide and secondary butyl alcohol, and wherein the amount of secondary butyl alcohol is 0.6 mole of alcohol per mole of total aldehyde in the impure mixture.

References Cited
UNITED STATES PATENTS

| 2,779,801 | 1/1957 | Finch et al. | 260—638 |
|---|---|---|---|
| 2,774,792 | 12/1956 | Carlson et al. | 260—601 |

LEON ZITVER, *Primary Examiner.*

R. H. LILES, *Assistant Examiner.*